Feb. 24, 1970　　K. J. E. ANDERSSON　　3,496,860
ROTARY CLEANING APPARATUS
Filed Aug. 20, 1968
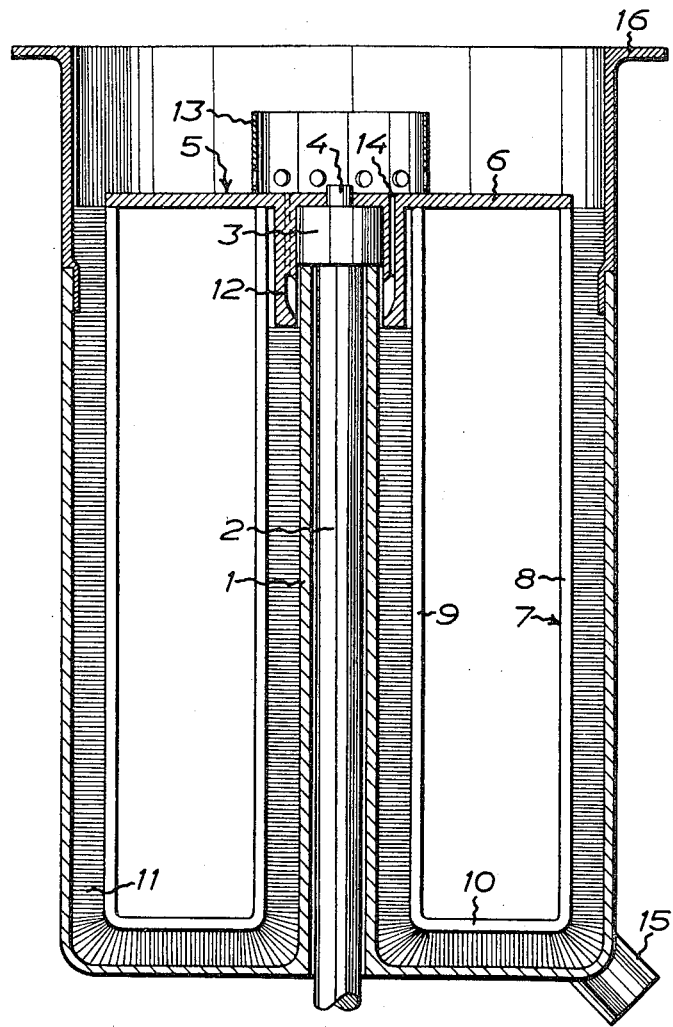

United States Patent Office 3,496,860
Patented Feb. 24, 1970

3,496,860
ROTARY CLEANING APPARATUS
Knut Johan Eugen Andersson, Ljungby, Sweden, assignor to AB Rostfria Infredningar, Lund, Sweden
Filed Aug. 20, 1968, Ser. No. 754,083
Int. Cl. A01j
U.S. Cl. 99—234
8 Claims

ABSTRACT OF THE DISCLOSURE

A rotary cleaning apparatus for cleaning vessels of complex form frequently used in such machines for preparing food, e.g. mashed potatoes, minced meat, ice-cream, or for mixing drinks etc., as are provided with a vessel having a vertically extending central tube for a drive shaft for rotating a food preparing tool.

---

Vessels of circular, usually cylindrical shape provided with a central tube for a drive shaft are often used for preparing various kinds of food, such as mashed potatoes, minced meat, ice-cream, or for mixing drinks etc. An indispensable sanitation requirement and often even a prerequisite for the use of such vessels is that they can be thoroughly cleaned. However, the complicated form of such vessels has made it extremely difficult to solve the problem of how an effective cleaning can be accomplished in a simple manner, and this problem is further aggravated by the frequent tendency of the food or liquid products prepared or kept in the vessel to form hard and not readily removable deposits, especially in the preparation of mashed potatoes.

To solve these problems, the present invention provides a cleaning apparatus comprising a cleaning tool adapted to be connected with said upper end portion of the drive shaft to be rotated thereby and having means to sweep the inside of the vessel and the outside of the tube when rotated by said drive shaft.

For the effective treatment of the surfaces to be cleaned, the cleaning tool, in a preferred embodiment, is so constructed that during its rotation it forms a hollow body of revolution surrounding the central tube and surrounded by the inside of the vessel in order to treat the tube and the inside of the vessel simultaneously and mechanically during the rotation, for which purpose the operating surfaces of the tool preferably support bristles.

By this arrangement, it is possible to utilize the drive of a previously installed machine also for operating the cleaning tool of the invention, and all manual work in connection with the actual cleaning are thus dispensed with.

The ivention will become more fully apparent from the following, detailed description of an apparatus, chosen by way of example, reference being made to the accompanying drawing which shows a vertical section of a cylindrical vessel of a food preparing machine and of a preferred embodiment of the apparatus according to the invention for cleaning the vessel.

In the drawing, there is shown a cylindrical vessel of a food preparing machine, said vessel comprising a bottom wall and a vertically extending side wall. From the center of the bottom of the cylindrical vessel, an open-ended tube 1 which extends upwardly and accommodates a drive shaft 2 for a food preparing tool, such as a masher, beater, stirrer, cutter etc., depending upon whether the vessel is used for the preparation of mashed potatoes, ice-cream, dough, minced meat etc. The vessel is stationarily supported on a base (not shown) and a drive (not shown) is supported on the base in a position beneath the vessel. The drive shaft 2 extends upwardly from the drive which may be an electric motor, passes through the open-ended tube 1 and projects through the upper end thereof, the upper end of the shaft having a supporting member or flange portion 3 which closes the upper end of the tube and supports a connecting pin 4 of e.g. non-circular form for connection with the food preparing tool to be driven by the shaft 2.

According to the invention, the drive shaft 2 is used for operating a rotary cleaning tool 5 comprising a supporting member in the form of a circular disc 6 having an opening for connection with the pin 4 of the drive shaft 2. On its inner side, the disc 6 carries a number of U-shaped bristle holders 7 preferably formed of bent metal rods fixed to the disc at their limb ends. The two ends of each holder are fixed to the disc 6 at points on the same radius, and the holders are equiangularly spaced around the disc. The outer and inner limbs 8, 9 and the webs 10 of the holders extend parallel to the inside of the vessel, to the outside of the central tube and to the bottom of the vessel, respectively, at a suitable short distance therefrom and carry bristles 11 extending into contact with the respective surfaces to sweep and scrub these surfaces during the rotation of the cleaning tool, which is effected by the drive shaft 2. During rotation of the cleaning tool, the limbs 8, 9 of the bristle holders 7 move in two concentric circular paths, thereby forming a hollow body of revolution, the surfaces of which are concentric with the respective surfaces of the vessel.

To the underside of the circular disc 6 at the central portion thereof and opposite the central space between the inner limbs 9 of the bristle holders, there is attached a hub sleeve 12 which depends from the disc into said central space and surrounds the shaft end 3 projecting from the central tube 1 and also surrounds the upper portion of said tube. In the center of the upper side of the disc 6, there is attached an annular flange 13 having relatively large diameter and serving as a receptacle for water which is to be introduced into the vessel for the cleaning operation. To this end, the circular disc 6 and the hub sleeve 12 are provided with passages 14 conducting the water and opening adjacent the central tube below the upper end thereof. The annular flange 13 can be provided with apertures, and one or more channels, pipes or the like lead from the socket to the periphery of the disc 6 to conduct water also to the inside of the vessel. However, also without such an arrangement the water will be ejected by the disc against the side wall of the vessel during rotation of said disc, and will flow down towards the bottom wall. The central introduction of the water at the tube 1 compensates for the predominant tendency of the cleaning tool to fling the water against the wall of the vessel, another feature contributing to a favorable cleaning effect. The detergent can be supplied separately or together with the water and, if desired, water can be admitted during the entire cleaning operation and discharged continuously through a drain 15 which is disposed in the vessel and preferably can be closed, although this is not shown.

As can be seen from the drawing, a cylindrical wall 16 for elongating the side wall of the vessel is seated on the upper rim of the vessel, whereby it is possible to clean the vessel by means of the tool 5 all the way up to its upper rim. The water level can be allowed to rise above the rim and the upper end of the central tube 1 without any risk that water overflows or penetrates between the shaft end 3 and the tube, because the shaft and tube ends are protected by the hub sleeve 12. The cylindrical wall 16 of the vessel can be used as a funnel for feeding food into the vessel, and after such use it can be cleaned separately or by means of the cleaning tool, if this is elongated upwardly so that it sweeps also over the wall 16. In the illustrated embodiment, only the lower part of the wall 16 is swept by the bristles 11.

The bristle holders 7 and the support disc 6 therefor can be designed differently. For instance, the disc 6 can be in the form of a spider with as many arms as the number of bristle holders. The bristle holders can be replaced by a single cylindrical member with walls parallel to the surfaces to be cleaned, or with arms, for instance in the form of rods. The number of holders 7 of the type illustrated or in the form of arms can vary. Thus, the cleaning tool 5 can be used with one holder only, although a larger number is preferred.

Another and obvious modification is to replace the bristles by some other suitable material, or to combine the bristles with such material, for instance so that some arms carry bristles and other strips of plastic material or the like.

Furthermore, the holders for the bristles or other suitable material can be shaped to fit vessels of another type than the one illustrated, for instance vessels with a cup-shaped wall or vessels having a rounded lower wall portion.

What I claim and desire to secure by Letters Patent is:

1. In a machine for preparing various kinds of food, such as mashed potatoes, minced meat, ice-cream etc., comprising a vessel for containing the food during the preparation thereof and provided with a vertically extending central tube, and a rotatable drive-shaft adapted to support and rotate food preparing tools in said vessel, said drive shaft being disposed partially in the central tube and having an upper end portion projecting from the upper end of said tube, an apparatus for cleaning the vessel, said apparatus comprising a cleaning tool adapted to be connected with said upper end portion of the drive shaft to be rotated thereby and having means to sweep the inside of the vessel and the outside of the tube when rotated by said drive shaft.

2. An apparatus according to claim 1, wherein said vessel is provided with side and bottom walls which in cooperation with said central tube define a space of radially symmetrical form and wherein said cleaning tool includes operating portions of such a shape as to form, during the rotation thereof, a hollow body of revolution surrounding the central tube and surrounded by said walls of the vessel in order to effect mechanical treatment of the outside of the tube and the inside of the vessel simultaneously during the rotation.

3. An apparatus according to claim 2, wherein said operating portions of the cleaning tool support bristles for scrubbing the inside of the vessel and the outside of said tube during the rotation of said tool.

4. An apparatus according to claim 2, wherein said cleaning tool comprises at its outer end a centrally disposed sleeve means adapted to receive said upper end portion of the drive shaft to be supported thereon and means for connecting the cleaning tool with said end portion.

5. An apparatus according to claim 4, wherein said cleaning tool includes a disc which forms an upper end of said tool and supports said sleeve means with the sleeve depending from the central portion of the inner side of said disc, and means for conducting cleaning water into the vessel and to the cleaning tool surfaces.

6. An apparatus according to claim 5, wherein said means for conducting water includes passages in the walls of said sleeve and said disc for introduction of water in a central area of said vessel and, optionally, means for introduction of water in the peripheral areas thereof.

7. In a machine for preparing various kinds of food, such as mashed potatoes, minced meat, ice-cream etc., comprising a vessel for containing the food during the preparation thereof and provided with a vertically extending central tube, and a rotatable drive shaft adapted to support and rotate food preparing tools in said vessel, said drive shaft being disposed partially in the central tube and having an upper end portion projecting from the upper end of said tube, an apparatus for cleaning the vessel, said apparatus comprising a cleaning tool adapted to be connected with said end portion of the drive shaft to be rotated thereby and having means to sweep the inside of the vessel and the outside of the tube when rotated by said drive shaft, and a wall member elongating the side wall of the vessel, said wall member being adapted to be detachably connected with the upper end of said vessel to facilitate cleaning of the inner side of the vessel and the outer side of the central tube in the areas at the upper ends thereof.

8. An apparatus according to claim 7, wherein said wall member is adapted to serve as a funnel for feeding food into the vessel and wherein said cleaning tool is adapted to clean said funnel and the vessel simultaneously.

References Cited

UNITED STATES PATENTS

| | | | |
|---|---|---|---|
| 896,722 | 8/1908 | Gottschalk | 15—56 |
| 1,228,851 | 6/1917 | Valerius | 15—71 |
| 1,697,656 | 1/1929 | Kracke | 259—107 |
| 2,274,309 | 2/1942 | Velton | 15—56 |
| 2,942,284 | 6/1960 | Luker | 15—56 |

ROBERT W. JENKINS, Primary Examiner

U.S. Cl. X.R.

15—56